United States Patent [19]

Colas et al.

[11] Patent Number: 4,919,504

[45] Date of Patent: Apr. 24, 1990

[54] GRADED-INDEX WAVEGUIDES

[75] Inventors: Etienne G. Colas, Asbury Park; Alfredo Yi-Yan, Eatontown Boro, both of N.J.

[73] Assignee: Bell Communications Research, Inc., Livingston, N.J.

[21] Appl. No.: 353,407

[22] Filed: May 17, 1989

[51] Int. Cl.$^5$ .............................................. G02B 6/10
[52] U.S. Cl. .............................. 350/96.12; 350/96.31
[58] Field of Search ............... 350/96.11, 96.12, 96.13, 350/96.31

OTHER PUBLICATIONS

Yoshikawa et al., "A Novel Technology for Formation of a Narrow Active Layer in Buried Heterostructure Laser by Single-Step MOCVD," IEEE Journal of Quintum Electronics, 1987, Vol. QE-23, pp. 725-729.

Primary Examiner—William L. Sikes
Assistant Examiner—Robert E. Wise
Attorney, Agent, or Firm—James W. Falk; Charles S. Guenzer

[57] ABSTRACT

A planar waveguide comprises a semiconductor substrate having one or more grooves along the surface of the substrate. A plurality of sequences of superlattice layers separated by a spacer layer over the grooved substrate is provided. The number of superlattice periods in each sequence changes from the base of the groove to the surface of the waveguide so as to provide a graded index of refraction in at least a portion of the region above the groove.

10 Claims, 5 Drawing Sheets

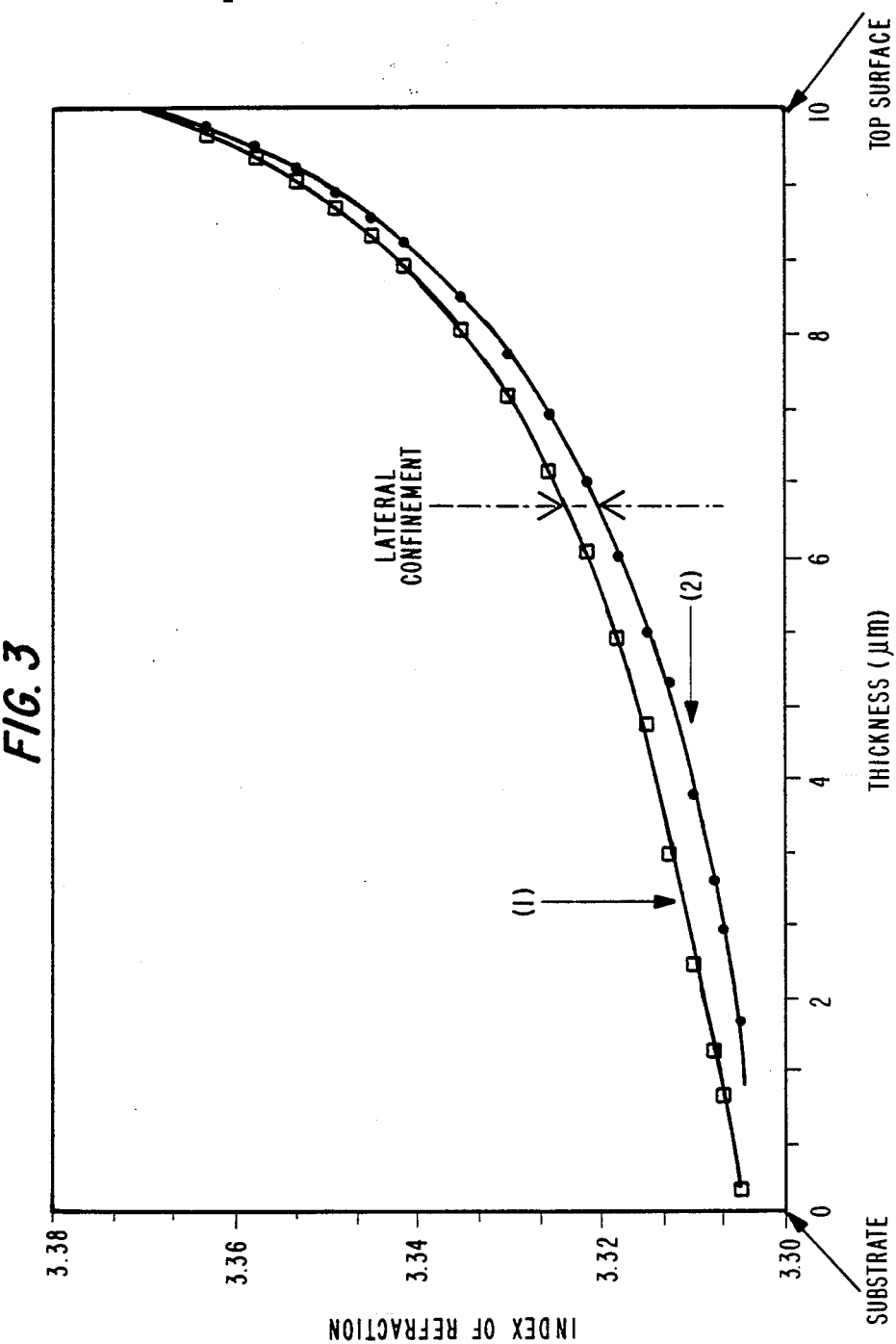

GRADED-INDEX WAVEGUIDES

FIELD OF THE INVENTION

This invention relates to thin film optical waveguides and more particularly to optical waveguides having a graded refractive index.

BACKGROUND OF THE INVENTION

"Thick" (<50 nm) epitaxial layers have been grown on nonplanar substrates by various growth techniques, e.g., liquid phase epitaxy (LPE), molecular beam epitaxy (MBE), and organometallic chemical vapor deposition (OMCVD). In all cases, the nonplanarity of the substrate gives rise to lateral thickness variations in the epitaxial layers. Such laterally patterned structures have been useful for optical wave guiding.

Ultra-thin (>50 nm) epitaxial layers have also been grown on planar substrates. For such thin layers i.e., layers whose thickness is comparable to the deBroglie wavelength of charge carriers) quantum size effects in one dimension (along the growth direction) modify the material properties (e.g., bandgap and refractive index). Hence, by tailoring the thickness of the epitaxial layers, it has been possible to vary the resulting superlattice (or quantum well) material properties. For example, selection of the suprlattice (SL) periodicity results in selection of the material bandgap. In addition, these superlattices give rise to new features, e.g., enhanced nonlinear optical properties. Furthermore, it has been shown that the SL period (or layer thicknesses) in the direction of layer growth, allows one to fabricate structured materials in which the physical properties in the direction normal to the substrate plane differ based upon the SL period. Devices which rely not only upon the new properties of the SL materials, but also on quantum size effects that occur in the individual layers, have also been demonstrated, e.g., quantum well lasers, resonant tunneling devices, quantum-confined Stark effect modulators, etc.

In U.S. patent application Ser. No. 323,402, filed Mar. 14, 1989, for E. Kapon, entitled "Semiconductor Superlattice Heterostructures on NonPlanar Substrates" and assigned to the same assignee as this application, there is disclosed a method of forming thin (>50 nm) epitaxially grown semiconductor layers having a superlattice with laterally varying periodicity grown on a nonplanar e.g., grooved substrate. The layers vary in thickness and, hence, physical properties laterally along the substrate plane.

The production of optical waveguides with low propagation losses and optical waveguide structures with improved design for Y-junctions and interconnection is still sought after in the art.

SUMMARY OF THE INVENTION

A graded refractive index embedded core optical waveguide comprises a semiconductor substrate having one or more lateral grooves in a surface thereof. A plurality of alternating layers of a first material and a second material of a different refractive index than the first material fill the grooves, said layers further extending beyond the top of said groove to form a planar structure having a refractive index cusp at or near the top of the grooves. The effective refractive index of the layers on the surface of the substrate adjacent the cusps is less than the effective refractive index of the layers forming the cusp. Also, the effective refractive index at any point in at least one region of a groove is greater than the effective refractive index of the underlying material in that region. Further, the average thickness between alternating layers in at least one region decreases as the distance from the base of the groove increases.

BRIEF DESCRIPTION OF THE DRAWING

FIG. 3 is a plot of the refraction for a structure as shown in FIG. 1, as a function of the thickness of the grown layers. Curves (1) and (2) correspond to the groove and the flat areas, respectively.

DETAILED DESCRIPTION

Figure 1:
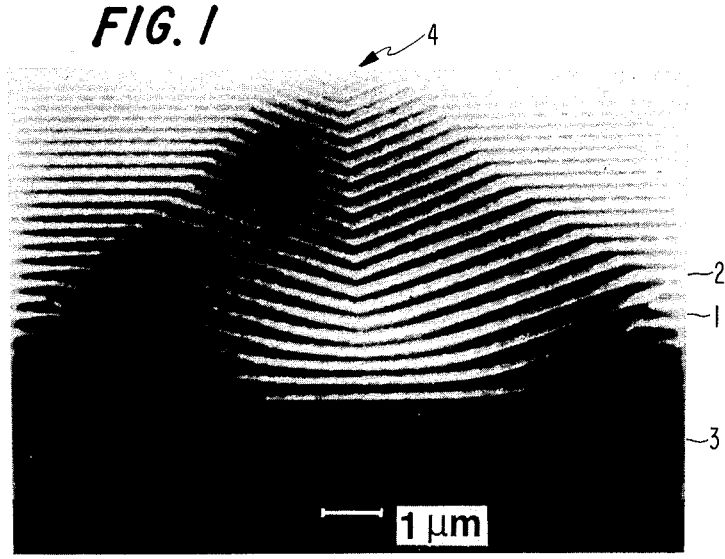
FIG. 1 is a photomicrograph showing the cross section of a portion of one embodiment of the invention.

We have discovered that by forming a tailored refractive index profile of semiconductor layers grown within and above the top of a groove formed within a semiconductor substrate a graded index of refraction is achievable which gives rise to the confinement of light within any desired region within such layers. The structures which are achieved by selecting the growth conditions of the layers to be formed also allows for the confinement of light at a cusp of a planarized structure formed over a previously etched groove by continued growth of layers above the top of the groove which results in the cusp and the planarized surface, wherein the cusp has a higher index of refraction that the surrounding material of the planarized surface. It should be noted that the top of the cups, formed as an inverted V-shape, may be a point, rounded or flat.

Growth techniques based upon organometallic chemical vapor deposition (OMCVD) and the effect of growth parameters of the resulting structures are set forth herein as well as waveguiding applications of these and other structures. However, it should be understood that the concepts set forth may be used by those skilled in the art to form other similar type structures. However, it should be undestood that the concepts set forth may be used by those skilled in the art to form other similar type structures. Further, other growth techniques known in the art, e.g., molecular beam epitaxy and the like may be employed as an alternative to OMCVD processes and this invention is not limited to the specific structures, materials or methods set forth herein.

Optoelectronic integration for the production of structures which lead to lateral confinement of light and carriers for laser applications and two dimensional gases have recently been reported. These structures require that variations in the physical properties of semiconductor structures be controlled not only vertically in the growth direction but laterally as well. Recent studies of the growth of GaAs and AlGaAs structures on nonplanar substrates have revealed temperature-dependent growth rate differences on the exposed facets of etched grooves depending upon the crystallographic plane of the facet. These growth rate differences have been used to produce the aforementioned laterally light and carrier confined structures.

In accordance with the present invention, GaAs/AlGaAs superlattice structures are grown on a GaAs substrate having photolithographically etched grooves as by means of OMCVD techniques. The method takes advantage of differences of the relative growth rates of GaAs and AlGaAs on various crystallographic orientations to control the average local Al concentration and hence the average local index of refraction. These materials are examples of multi-component semiconductors having a zincblende crystal structure for which the refractive index can be changed by varying the composition during epitaxial growth. We have discovered with this technique, that by reducing the number of superlattice periods, as a function of growth, one can reduce propagation losses due to a reduction of leakage into the underlying GaAs substrate. Further, for waveguides with cusps grown above the groove to the same level as the surface of the sample, light can be confined within the cusp. This gives rise to applications for integrated optoelectronic waveguide devices. For example, electronic devices can be formed by known methods on the planarized surface to give a monolithic integrated structure. Where cusps are formed below the surface of the sample, e.g., growth on narrow grooves (typically <9 $\mu$m), light is confined between the cusp and the top surface. Further, we have discovered that because the level of the cusp is dependent on the initial groove width, two dimensional tapers can be obtained by growing the superlattice layers in a tapered groove, i.e., a groove having a width that decreases along its length. Such structures can have applications, for example, for the formation of Y-junctions, horn connections between stripe and planar waveguides and optical fiber butt-coupling.

As used herein, the cusp refers to the height of the grown layers extending above the groove which layers are inclined with respect to the plane of the surface of the substrate. Also, the 'period' of a superlattice is defined herein as the thickness of each pair of repetitive thin film layers employed in constructing the superlattice structure.

The desired refractive index grading is achieved in accordance with the embodiment of invention described herein by providing a series of GaAs/AlGaAs superlattices with varying numbers of periods, spaced by GaAs layers of constant thickness on the grooved substrate. Alternatively, one can vary the period and/or the composition of the grown layers to achieve similar results. The index of refraction profiles achieved result not only from growth rate differences associated with facet orientation of the grooves, but in accordance with the present embodiment, they also result from the sequence of superlattice periods. We effectively digitize a continuous index of refraction profile using steps that are smaller than the wavelength of light to be guided. Further, by continuing growth so as to achieve full planarization of the grown structures such that the waveguides are buried, monolithic optoelectronic devices can be fabricated by growing electronic device components on top of the waveguides.

In accordance with the preferred method epitaxial layers are grown on nonplanar GaAs single crystal substrates which are prepared by first etching sets of parallel grooves, 5–16 microns wide, aligned along the [011] or the [01$\bar{1}$] crystal directions on [100] oriented substrates. The grooves are etched through a photoresist mask using an acid peroxide solution e.g., 1 part by volume $H_2SO_4$:8 parts 30%$H_2O_2$:40 parts $H_2O$. The [011] grooves have a dove-tail profile. The photoresist is then removed and the substrate is degreased. They are then dipped in concentrated HCl, rinsed in methanol and etched again for about 20 seconds in a 20:1:1 by volume solution of $H_2SO_4$:$H_2O_2$(30%):$H_2O$ respectively. The substrate is finally rinsed in deionized water and spun dry prior to placement into the OMCVD reactor.

The epitaxial layers were grown in a horizontal, r.f. heated OMCVD reactor at atmospheric pressure using trimethylgallium (TMG), trimethylaluminum (TMA) and arsine. The reactants are transported to the reactor through a fast switching manifold using 19 liters/min. of Pd-diffused hydrogen as a carrier gas. The mole fractions of TMG and TMA are adjusted to achieve growth rates in the range of 1–2 nm/sec. for both GaAs and $Al_{0.47}Ga_{0.53}$;1 As. A growth temperature of about 650° C. gives low background doping $Al_{0.47}Ga_{0.53}As$ and GaAs layers. The reactive gases were switched to provide sets of successive alternating layers consisting of 5 nm GaAs/5 nm AlGaAs superlattice. Neighboring groups of superlattices were separated by a 157 nm GaAs interlayer. The bottom-most superlattice period was repeated to form 28 superlattice periods in the group before the GaAs interlayer was deposited. Thereafter the number of periods decreased from the 28 to 1 near the top of the epitaxial layers, each group of superlattice periods being separated by the 157 nm GaAs interlayer. The initial depth of the etched groove was 1.6 $\mu$m. The total thickness of epitaxial material grown was 8.4$\mu$m as measured on the nonetched, flat area of the substrate and 10 microns over the grooved area at the point where the grown material planarized. Thus, an 8.4 $\mu$m cusp was formed over the groove at the time of planarization. This cusp has a refractive index greater than that of the adjacent material formed over the flat portion of the substrate between grooves. Further, due to the decrease in the number of superlattice periods prior to intervention of the GaAs interlayer as one continues up from the bottom of the groove, there is a corresponding increase in average refractive index as one ascends from the bottom of the groove, giving rise to a graded average index of refraction from the bottom of the groove to the top of the epitaxially grown layers. This configuration confines the light to be waveguided to near the surface of the cusp.

It will be understood that one can modify the structure such that the region of graded refractive index does not occup the entire height of and above the groove or, where desired to obtain a deeply embedded waveguide, the grading can be reversed, e.g., by increasing the number of superlattice periods between interlayers at any point during epitaxial layer formation. Alternatively this can also be achieved by other means as well, e.g., by changing the superlattice period thickness, the interlayer thickness or the composition of the deposited material.

Referring to FIG. 1, there is shown a scanning electron micrograph of a stained cross-section of a grooved structure grown as set forth above. Vertical dimensions appear smaller than normal due to a tilt of the section in the microscope. Dark and light areas correspond to the superlattice group layer 1 and to the GaAs spacer layers 2 respectively. These layers 1 and 2 as indicated are grown over a GaAs substrate 3 having its upper surface oriented toward [100]. The substrate 3 is etched to form a groove extending laterally along the [011] direction (from left to right as illustrated) and axially along the [01$\bar{1}$] direction (into the illustrated cross-sectional plane). The number of superlattice periods between spacer layers 2 diminishes as one progresses upwardly from the base of the groove.

Figure 2:
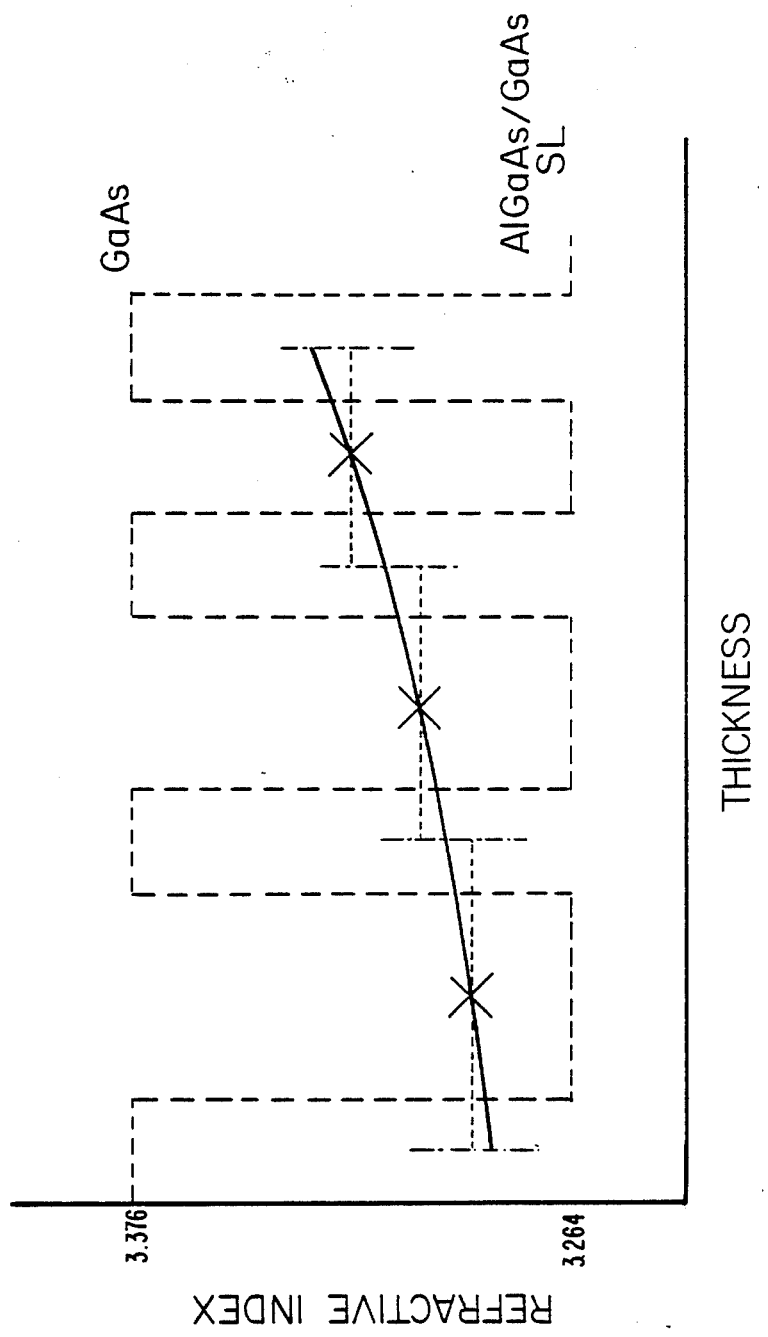
FIG. 2 is a graphical representation of the portion of the various layers grown on the substrate showing the relative thickness of successive superlattice and spacer layers as a function of refractive index used to demonstrate the average index of refraction profile of the structure as a function of thickness.

The structure of the cusp 4 near the groove shows an outwardly extending interface (oriented in the [1$\bar{1}$1]B direction on the right side of the cusp 4) between the groove-controlled growth and the plane-controlled growth. Once the growth has become continuous between the groove and plane regions, the interface reverses directions to provide a triangular or Δ-shaped (inverted V-shaped) cross-section and to manifest growth proceeding in the [4$\bar{1}$1] direction within the upper right side of the cusp 4. The index of refraction profiles were determined by calculating the average Al composition for a region consisting of a superlattice and the neighboring GaAs interlayer as is shown in FIG. 2. The corresponding index of refraction was considered to be the average value for that region and was therefore attributed to its center. To support this approach, we note that the thicknesses of these regions never exceeded 0.4 μm, which is smaller than λ/n, the wavelength of the light in the material (in order of 0.5 μm, for the 1.52 μm light source used to test the structures). The graded average index of refraction can be seen by the curve in FIG. 2, the average index of refraction increasing as one goes from the base of the groove where the number of SL periods are large as compared with the layers above it where the number of SL periods between spacer layers decreases. FIG. 3 shows the index of refraction profiles in the vertical direction both in the groove area (curve 1) and on the adjacent flat area (curve 2) for the structure of FIG. 1. In the groove area, the total thickness of the grown layer is 10 microns as opposed to 8.4 microns on the flat area, but the end points for the index of refraction are the same since growth starts—and finishes—on a [100] surface in both regions. Curve 1 is therefore displaced towards higher values compared to curve 2. The difference between the two curves at a given thickness accounts for lateral confinement in the groove area as indicated in FIG. 3. This difference decreases as growth proceeds. The width and the depth of the wide V-shaped structures in the groove decrease as growth tends towards planarization (see FIG. 1), and the corresponding lowering of Al composition in the groove relative to that on the flat area next to it decreases. We notice here that the use of superlattices is not the only way to achieve index profiles of the types shown in FIG. 3. These superlattices could be replaced by $Al_{0.24}Ga_{0.76}As$ layers of decreasing thicknesses as growth proceeds. Similar refractive index profiles and waveguiding properties would be expected. The use of superlattices, however, allows very precise control of the desired index profiles.

Figure 4:
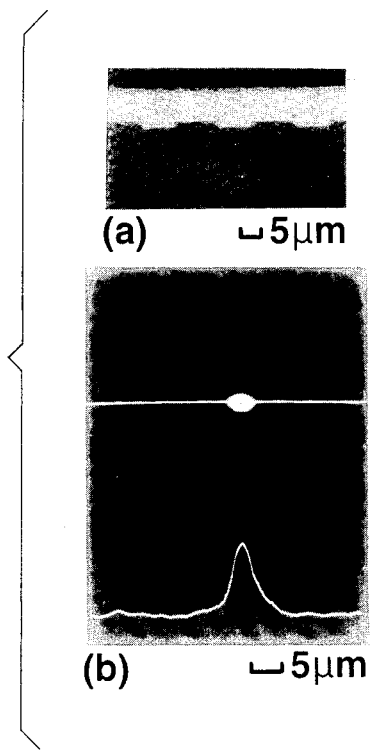
FIG. 4(a) is an optical micrograph of the stained cross-section of an array of waveguides of the same dimension as the waveguide of FIG. 1.
FIG. 4(b) is the near-field pattern for TE-polarized light of one waveguide of the array demonstrating waveguiding at 1:52 $\mu$m wavelength.

The structure in FIG. 1 was tested for waveguiding at 1.52 microns wavelength with a HeNe laser. The linearly polarized laser beam was coupled from a fiber into the waveguides through a cleaved edge. The cleaved output edge of the waveguides was examined using a microscope objectiv lens and an infrared video camera. The guided optical field patterns were displayed on a TV monitor. FIG. 4(a) shows an optical micrograph of the cross-section of an array of waveguides and FIG. 4(b) the near-field light intensity pattern, observed at the output facet when TE-polarized light was injected into the groove area. Waveguiding effects have been confirmed by two main observations: the light single-lobe near-field pattern, as shown in FIG. 4(b), were only observed for waveguides of the type shown in FIG. 4(a) and there was no confinement of light (in depth or laterally) within the region separating two grooves. The large vertical index variations suggests that additional modes are likely to be present in these structures. But, output light intensity peaks did not shift when the fiber was scanned across the input facet. This means that additional modes are leaky if present in this structure. These conditions prevailed for groove widths of about 10 μm, larger width grooves exhibiting more complicated mode patterns. The propagation losses of the waveguide shown in FIG. 1 were determined by the Fabry-Perot (FP) method, using waveguide lengths of the order of 1 cm. The waveguide resonators were formed by its two cleaved ends, and well-defined peaks were observed for the FP fringes. A series of waveguides were tested with loss values ranging from 1.6 to 2 dB/cm. It was anticipated that the presence of leaky modes could be eliminated and that losses could be decreased further by including a high Al containing single or composite buffer layer. Such a structure was constructed and is shown with reference to FIG. 5.

Figure 5:
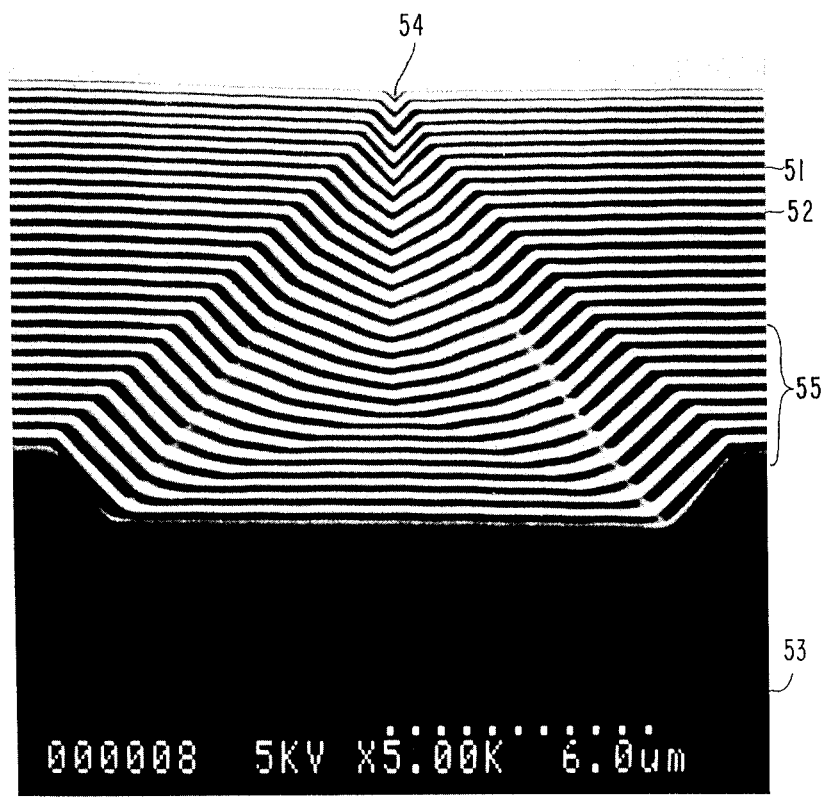
FIG. 5 is an optical micrograph of a stained cross-section of a portion of an optical waveguide formed on GaAs in a direction 90° from that shown in the embodiment of FIG. 1.

The cross-section shown in the photomicrograph of FIG. 5 was grown similarly to the structure described with respect to FIG. 1 wherein the dark regions 51 correspond to the superlattices, the light areas 52 correspond to the spacer layer, the dark base 53 is the grooved substrate, and 54 is cusp above the groove. In this embodiment, however, the grooves in the (100) GaAs substrate extended laterally in the [011] direction and axially in the [01$\bar{1}$] direction. Furthermore, the number of superlattice priods in the first nine groups 55 of superlattice/GaAs spacer layers remained constant so as to provide a buffer layer of uniform refractive index. The number of periods were gradually reduced above the buffer layer until a planar surface was obtained. The use of the buffer layer reduced the leaky modes which resulted in loss at the superlattice/substrate interface. Measurements of this structure showed a loss of only 0.7 dB/cm.

Figure 6:
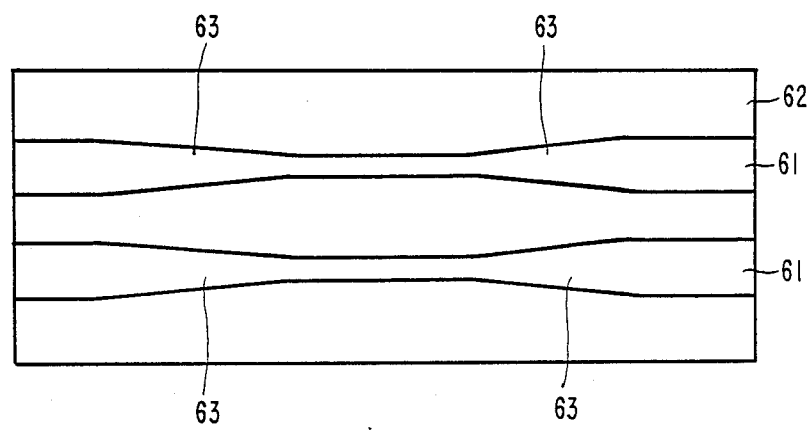
FIG. 6 is a plan view of an embodiment of the invention employing tapered waveguide grooves.

In another embodiment of the invention, as shown in the top plan view of FIG. 6, the grooves 61 formed in the semiconductor substrate 62 have a nonuniform (tapered) width over portions 63 of the grooves 61. The structure results in a two-dimensionally tapered waveguide which would be particularly useful as a mode matching element between butt-coupled fibers on the wide side of the taper and optical devices on the narrow side, these devices having cross-sections smaller than the core diameter of single mode fibers.

What is claimed is:

1. An optical waveguide having a graded index of refraction comprising a semiconductor substrate having one or more grooves extending along a surface thereof, and means, over and within said grooves, for providing a graded effective index of refraction including a region having an increasing effective index of refraction extending upwardly toward the surface of the waveguide, said means extending beyond the top of the groove to form a planar surface having refractive index cusps over the grooves wherein the effective refractive index of the material adjacent the cusps is less than the effective refractive index of the material forming the cusps.

2. The optical waveguide recited in claim 1 having a variation in the effective index of refraction which provides waveguiding in a region near the top of the cusp.

3. The optical waveguide recited in claim 1 wherein said means for providing a graded effective index of refraction comprises consecutive sequences of a plurality of superlattice periods followed by a spacer material wherein the effective index of refraction is altered from the base of the groove to the end of the consecutive sequences by at least one of the following (1) a difference in the number of superlattice periods in succeeding sequences, (29 a difference in the thickness of the superlattice periods as between succeeding sequences or (3) a change in the composition of the layers forming the superlattice as between succeeding sequences.

4. The optical waveguide recited in claim 3 wherein the thickness of each sequence of superlattice period is less than the wavelength of the mode of light propagated by the waveguide.

5. The optical waveguide recited in claim 3 wherein the effective index of refraction is altered continuously from the base of the groove to the top of the cusp by means of reducing the number of superlattice periods in consecutive sequences while maintaining a constant thickness of each superlattice period and each spacer, said spacer thickness being substantially greater than the thickness of each superlattice period.

6. The optical waveguide recited in claim 3 wherein the effective index of refraction is altered continuously from the base of the groove to a level prior to reaching the top of the cusp by means of reducing the number of superlattice periods in consecutive sequences while maintaining a constant thickness of each period and of each spacer and then increasing the number of superlattice periods in subsequent consecutive sequences so as to confine waveguiding to a region below the top of the cusp.

7. The optical waveguide recited in claim 1 wherein at least a portion of said groove has a taper forming varying groove width.

8. An optical waveguide having a graded index of refraction comprising a GaAs substrate having one or more lateral grooves in a surface thereof, consecutive sequences comprising a plurality of superlattice periods followed by a thicker spacer layer, each sequence of superlattice periods being less than the wavelength of light propagated by the waveguide and consisting essentially of alternate thin layers of GaAs and AlGaAs, filling and extending beyond the surface of said groove so as to provide a cusp of deposited material over said groove and a planar surface wherein the effective refractive index of the cusp is greater than the effective refractive index of the material adjacent the cusp and wherein the number of periods in succeeding sequences decreases from the base of the groove to at or near the top of the cusp in a manner to cause waveguiding at or near the top of the cusp.

9. The optical waveguide recited in claim 8 wherein at least a portion of said groove is tapered laterally along the length of the groove to provide a groove with a varying width.

10. An optical waveguide structure, comprising:
   a zincblende semiconductor substrate having at least one groove formed in a surface thereof; and
   a multi-component zinclbende semiconductor layered structure epitaxially formed on said substrate at least in area overlying said groove, said layered structure having an inverted V-shaped region over said groove, a refractive index of said layered structure determined by a local semiconductor composition increasing from a botto to a top of said inverted V-shaped region and decreasing horizontally from an interior to an exterior of said inverted V-shaped region.

* * * * *

UNITED STATES PATENT AND TRADEMARK OFFICE
CERTIFICATE OF CORRECTION

PATENT NO. : 4,919,504

DATED : April 24, 1990

INVENTOR(S) : Etienne G. Colas and Alfredo Yi-Yan

It is certified that error appears in the above-identified patent and that said Letters Patent is hereby corrected as shown below:

Column 3, line 4, "verticalLy" should read "vertically".
Column 4, line 29, "$Al_{0.47}Ga_{0.53}$;1 As." should read --$Al_{0.47}Ga_{0.53}As$.--;
  line 62, "occup" should read --occupy--.
Column 5, line 12, "[011]" should read --[01$\bar{1}$]--.
Column 6, line 6, "objectiv" should read --objective--.
Column 7, line 22, "(29" should read --(2)--.
Column 8, line 33, "zinclbende" should read --zincblende--;
  line 39, "botto" should read --bottom--.

Signed and Sealed this

Seventeenth Day of September, 1991

*Attest:*

HARRY F. MANBECK, JR.

*Attesting Officer*  *Commissioner of Patents and Trademarks*